United States Patent
Ermanoski (10) Patent No.: US 11,926,526 B2
(45) Date of Patent: Mar. 12, 2024

(54) TWO-STEP THERMOCHEMICAL REACTOR

(71) Applicant: ARIZONA BOARD OF REGENTS ON BEHALF OF ARIZONA STATE UNIVERSITY, Scottsdale, AZ (US)

(72) Inventor: Ivan Ermanoski, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 682 days.

(21) Appl. No.: 17/116,669

(22) Filed: Dec. 9, 2020

(65) Prior Publication Data

US 2021/0171343 A1    Jun. 10, 2021

Related U.S. Application Data

(60) Provisional application No. 62/946,006, filed on Dec. 10, 2019.

(51) Int. Cl.
*C01B 3/06* (2006.01)
*B01J 19/00* (2006.01)
*B01J 19/24* (2006.01)

(52) U.S. Cl.
CPC .......... *C01B 3/063* (2013.01); *B01J 19/0013* (2013.01); *B01J 19/2465* (2013.01); *B01J 2219/00135* (2013.01); *B01J 2219/0015* (2013.01)

(58) Field of Classification Search
CPC ..... C01B 3/63; B01J 19/0013; B01J 19/2465; B01J 2219/00135; B01J 2219/0015
USPC ...................................................... 252/373
See application file for complete search history.

(56) References Cited

U.S. PATENT DOCUMENTS 9,815,042 B1    11/2017 Ermanoski

OTHER PUBLICATIONS

Demonstration of the entire production chain to renewable kerosene via solar thermochemical splitting of H2O and CO2 Daniel Marxer et al Energy and Fuels, V29, I-5, pp. 3241-3250 (Year: 2015).*
Paul, Brian K. et al., "Conceptual Design of a Manufacturing Process for an Automotive Microchannel Heat Exchanger", 17th International Refrigeration and Air Conditioning Conference at Purdue, Jul. 9-12, 2018 (13 pages).

(Continued)

*Primary Examiner* — Douglas B Call
(74) *Attorney, Agent, or Firm* — Rodney J. Fuller; BOOTH UDALL FULLER, PLC (57) ABSTRACT

A two-step thermochemical reactor and method are disclosed. The reactor includes a housing and a reactor cavity formed within, and surrounded by, thermal insulation within the housing. The reactor cavity includes at least one unit cell, each cell having an electric heat source and a reactive material. The reactor also includes a feedstock inlet and a product outlet in fluid communication with the reactor cavity. The reactor also includes a reducing configuration, with the inlet being closed and the electric heat source of each unit cell being driven to thermally reduce the reactive material at a first temperature, releasing oxygen into the cavity. The reactor also has a splitting configuration where the reactive material is at a second temperature that is lower than the first, the feedstock inlet open and introducing feedstock gas into the cavity to reoxidize the reactive material and split into a product gas.

16 Claims, 3 Drawing Sheets

(56) References Cited

OTHER PUBLICATIONS

Babiniec, Sean M. et al., "Investigation of LaxSr1-xCoyM1-yO3-δ (M=Mn, Fe) perovskite materials as thermochemical energy storage media", Solar Energy, 118:451-459 (2018).
Babiniec, S. M. et al., "Doped calcium manganites for advanced high-temperature thermochemical energy storage", Int J Energ Res, 40(2):280 (2016).
Ermanoski, Ivan et al., "A New Reactor Concept for Efficient Solar-Thermochemical Fuel Production", Journal of Solar Energy Engineering, 135:031002-1-031002-10 (Aug. 2013).
Ermanoski, Ivan et al., "Thermally-driven adsorption/desorption cycle for oxygen pumping in thermochemical fuel production", Solar Energy, 198:578-585 (2020).
Motto, Alexis L., "On the Exact Solution of a Class of Stackelberg Games", American Control Conference, Portland, OR, Jun. 8-10, 2005, pp. 249-250.
Ermanoski, Ivan, "Cascacing pressure thermal reduction for efficient solar fuel production", International Journal of Hydrogen Energy, 39:13114-13117 (2014).
Wang, Yi et al., "Mixed-integer linear programming-based optimal configuration planning for energy hub: Starting from scratch", Applied Energy, 210(3):1141-1150 (2018).

\* cited by examiner

TWO-STEP THERMOCHEMICAL REACTOR

RELATED APPLICATIONS

This application claims the benefit of U.S. provisional patent application 62/946,006, filed Dec. 10, 2019 titled "Two-Step Thermochemical Reactor," the entirety of the disclosure of which is hereby incorporated by this reference.

TECHNICAL FIELD

Aspects of this document relate generally to thermochemical reactors.

BACKGROUND

Thermochemical reactors can provide an effective means for water splitting and carbon dioxide splitting. These reactors are able to produce energized chemicals (e.g. $H_2$ and CO), which can subsequently be used in other chemical reactions (e.g. reductants, fuels etc.) or from which other chemicals can be made (e.g. hydrocarbon fuels, etc.). These reactors employ thermochemical cycles, which combine heat sources with chemical reactions to split bonds and generate a desired product stream.

In order for thermochemical reactors to be economically competitive with other competing technologies, they must be efficient while remaining sufficiently inexpensive to manufacture and operate. In water splitting, the main competing technologies are steam-methane reforming (which is not renewable) and electrolysis. The advantages thermochemical reactors may provide over electrolysis are a potentially much lower capital cost and improved robustness to impurities in the feedstock water. In CO2 splitting, thermochemical reactors are the most advanced technology, and have found application in CO2 re-utilization.

One of the ways that the operating expense of thermochemical reactors is kept down is through the use of renewable energy to provide the necessary heat. In some cases, conventional thermochemical reactors have harnessed direct, concentrated solar flux to provide the needed heat for splitting. However, such implementations are accompanied by a number of difficulties. Like other solar technologies, the use of concentrated solar flux is subject to the availability of direct exposure to sunlight, making production subject to a number of factors including weather conditions and the time of day. Furthermore, since thermochemical reactors need to carry out various steps at different temperatures, efficient use of concentrated solar flux requires the use of multiple chambers and moving reactive materials (e.g. metal oxide particles, etc.) rather than repeatedly cooling down the solar heated chamber. The incorporation of moving parts increases the cost of conventional thermochemical reactors, as well as the cost of maintenance.

SUMMARY

According to one aspect, a thermochemical reactor includes a housing having a thermal insulation, and a reactor cavity formed within, and surrounded by, the thermal insulation. The reactor cavity includes a plurality of unit cells, each unit cell of the plurality of unit cells having an electric heat source that is an incandescent heat lamp capable of reaching a first temperature of greater than 1600° C., and a reactive material including cerium oxide. The reactor also includes a feedstock inlet in fluid communication with the reactor cavity and coupled to a feedstock gas source supplying a feedstock gas, and a product outlet in fluid communication with the reactor cavity. The thermochemical reactor also includes a reducing configuration and a splitting configuration. The reducing configuration includes the inlet being closed and the electric heat source of each of the at least one unit cell being driven to thermally reduce the reactive material at the first temperature, releasing oxygen from the reactive material into the reactor cavity. The splitting configuration includes the reactive material of each of the at least one unit cell being maintained at a second temperature by the electric heat source, the second temperature lower than the first temperature, the feedstock inlet being open and introducing feedstock gas into the reactor cavity to react with and reoxidize the reactive material, the feedstock gas splitting into a product gas received from the reactor cavity through the product outlet, the product outlet being open. The feedstock gas includes at least one of steam and carbon dioxide, and wherein the product gas comprises at least one of hydrogen and carbon monoxide.

Particular embodiments may comprise one or more of the following features. For each unit cell in the plurality of unit cells, the reactive material may encircle the electric heat element. The reducing configuration may further include the reactor cavity being evacuated and maintained at a pressure that may be at least two orders of magnitude below atmospheric pressure to remove at least the oxygen released by the reactive material from the reactor cavity. For each of the plurality of unit cells, the reactive material may be stationary with respect to the electric heat source.

According to another aspect of the disclosure, a thermochemical reactor includes a housing comprising a thermal insulation, and a reactor cavity formed within, and surrounded by, the thermal insulation. The reactor cavity includes at least one unit cell, each unit cell of the at least one unit cell including an electric heat source capable of reaching a first temperature, and a reactive material. The reactor also includes a feedstock inlet in fluid communication with the reactor cavity and coupled to a feedstock gas source supplying a feedstock gas, and a product outlet in fluid communication with the reactor cavity. The thermochemical reactor also includes a reducing configuration and a splitting configuration. The reducing configuration includes the inlet being closed and the electric heat source of each of the at least one unit cell being driven to thermally reduce the reactive material at the first temperature, releasing oxygen from the reactive material into the reactor cavity. The splitting configuration includes the reactive material of each of the at least one unit cell being maintained at a second temperature by the electric heat source, the second temperature lower than the first temperature, the feedstock inlet being open and introducing feedstock gas into the reactor cavity to react with and reoxidize the reactive material, the feedstock gas splitting into a product gas received from the reactor cavity through the product outlet, the product outlet being open.

Particular embodiments may comprise one or more of the following features. The reactive material may include a metal oxide. The metal oxide may be cerium oxide. The feedstock gas may include at least one of steam and carbon dioxide, and the product gas may include at least one of hydrogen and carbon monoxide. The electric heat source may be an incandescent heat lamp. The first temperature may be above 1600° C. At least one of the product gas and the oxygen is removed from the reactor cavity using a sweep gas. The reducing configuration further comprises the reactor cavity being evacuated and maintained at a pressure at least two orders of magnitude below atmospheric pressure to remove at least the oxygen released by the reactive material from the reactor cavity.

According to yet another aspect of the disclosure, a method for a thermochemical reactor cycle includes heating a reactive material to a first temperature with an electric heat source to thermally reduce the reactive material and release oxygen. The reactive material and the electric heat source are enclosed within a reactor cavity formed within, and surrounded by, thermal insulation. The method also includes removing the released oxygen from the reactor cavity, and cooling the reactive material to a second temperature maintained by the electric heat source, the second temperature being lower than the first temperature. The method includes reoxidizing the reactive material by introducing a feedstock gas into the reactor cavity, the feedstock gas reacting with the reactive material and splitting into a product gas, and removing the product gas from the reactor cavity. The reactive material is stationary with respect to the electric heat source. The feedstock gas includes at least one of steam and carbon dioxide, and the product gas includes at least one of hydrogen and carbon monoxide.

Particular embodiments may comprise one or more of the following features. The electric heat source may be an incandescent heat lamp. The first temperature may be above 1600° C. The method may further include removing at least one of the product gas and the oxygen from the reactor cavity using a sweep gas. Removing the released oxygen from the reactor cavity may include evacuating the reactor cavity, removing the oxygen while maintaining the reactor cavity at a pressure at least two orders of magnitude below atmospheric pressure. The reactive material may encircle the electric heat element.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Thermochemical reactors can provide an effective means for water splitting and carbon dioxide splitting. These reactors are able to produce energized chemicals (e.g. $H_2$ and CO), which can subsequently be used in other chemical reactions (e.g. reductants, fuels etc.) or from which other chemicals can be made (e.g. hydrocarbon fuels, etc.). These reactors employ thermochemical cycles, which combine heat sources with chemical reactions to split bonds and generate a desired product stream.

In order for thermochemical reactors to be economically competitive with other competing technologies, they must be efficient while remaining sufficiently inexpensive to manufacture and operate. In water splitting, the main competing technologies are steam-methane reforming (which is not renewable) and electrolysis. The advantages thermochemical reactors may provide over electrolysis are a potentially much lower capital cost and improved robustness to impurities in the feedstock water. In $CO_2$ splitting, thermochemical reactors are the most advanced technology, and have found application in $CO_2$ re-utilization.

One of the ways that the operating expense of thermochemical reactors is kept down is through the use of renewable energy to provide the necessary heat. In some cases, conventional thermochemical reactors have harnessed direct, concentrated solar flux to provide the needed heat for splitting. However, such implementations are accompanied by a number of difficulties. Like other solar technologies, the use of concentrated solar flux is subject to the availability of direct exposure to sunlight, making production subject to a number of factors including weather conditions and the time of day. Furthermore, since thermochemical reactors need to carry out various steps at different temperatures, efficient use of concentrated solar flux requires the use of multiple chambers and moving reactive materials (e.g. metal oxide particles, etc.) rather than repeatedly cooling down the solar heated chamber. The incorporation of moving parts increases the cost of conventional thermochemical reactors, as well as the cost of maintenance.

Contemplated herein is an electrically powered two-step thermochemical reactor for water and $CO_2$ splitting. Unlike conventional thermochemical reactors, the reactors and methods contemplated herein are able to harness electrical heating in an economical way. Expense of operation and manufacture are kept down through the use of a modular design, inexpensive materials, and adaptability to work in conjunction with various renewable energy sources.

Compared to existing thermochemical reactor designs, the reactors contemplated herein are able to operate at higher temperatures with greater efficiency. The temperatures used for thermal reduction in conventional reactors that use concentrated solar flux are limited due to the unavoidable radiation losses through the reactor aperture. Operating at 1700° C., for example, would be extremely inefficient and not economically practical in a conventional thermochemical reactor. According to various embodiments, the reactors contemplated herein are able to thermally reduce a reactive material at temperatures exceeding 1700° C. The use of electric heating lamps means the reactor can afford to go to temperatures that are practically unobtainable with concentrated solar, and even if they could be reached, the losses through the aperture would be massive. These higher temperatures mean the reactor contemplated herein can provide a greater power density and higher efficiency than conventional reactors.

According to various embodiments, the reactor contemplated herein is able to outperform conventional reactors, and can do so without having any moving parts. The simple design and lack of moving parts results in a robust reactor that is compact, which further reduces unit cost and heat losses. The lack of moving parts also greatly reduces the cost of operation and maintenance, while increasing the lifespan of the reactor. Additionally, the thermochemical reactors contemplated herein are agnostic with respect to the source of electrical power, and are not reliant on the availability of direct solar flux.

An additional advantage provided by the lack of moving parts is that the contemplated thermochemical reactor may be implemented in a wide range of sizes, including sizes much smaller than possible with conventional reactor designs (e.g. handheld size, desktop sized, etc.). Additionally, the contemplated reactor is able to operate in a wider range of circumstances than conventional reactors. For example, the contemplated thermochemical reactor is able to operate using impure input water (e.g. ocean water, ground well water, etc.) which is subsequently turned into steam. Some embodiments of the contemplated reactor may be configured to be very rugged and easily adapted for use in less than ideal conditions.

The thermochemical reactor contemplated herein is less expensive when compared to conventional thermochemical reactors. In comparison with an electrolyzer, which may make more efficient use of electricity, the contemplated reactor is vastly less expensive. As the cost of electricity coming from renewable sources continues to drop, the advantage of the electrolyzer's efficient use of electricity will diminish even further.

Another advantage the thermochemical reactors contemplated herein have over conventional thermochemical reactors includes being compatible with a wider range of reactive materials. While the following discussion of various embodiments will be focused on using a metal oxide as the reactive material, specifically cerium, it should be noted that other metal oxides, such as iron oxide and zinc oxide, and many other oxides and reactive materials may be substituted. Those skilled in the art will recognize that changing the reactive material may also open up applications for the thermal reduction of feedstocks other than water and carbon dioxide, resulting in different products.

Figure 1A:
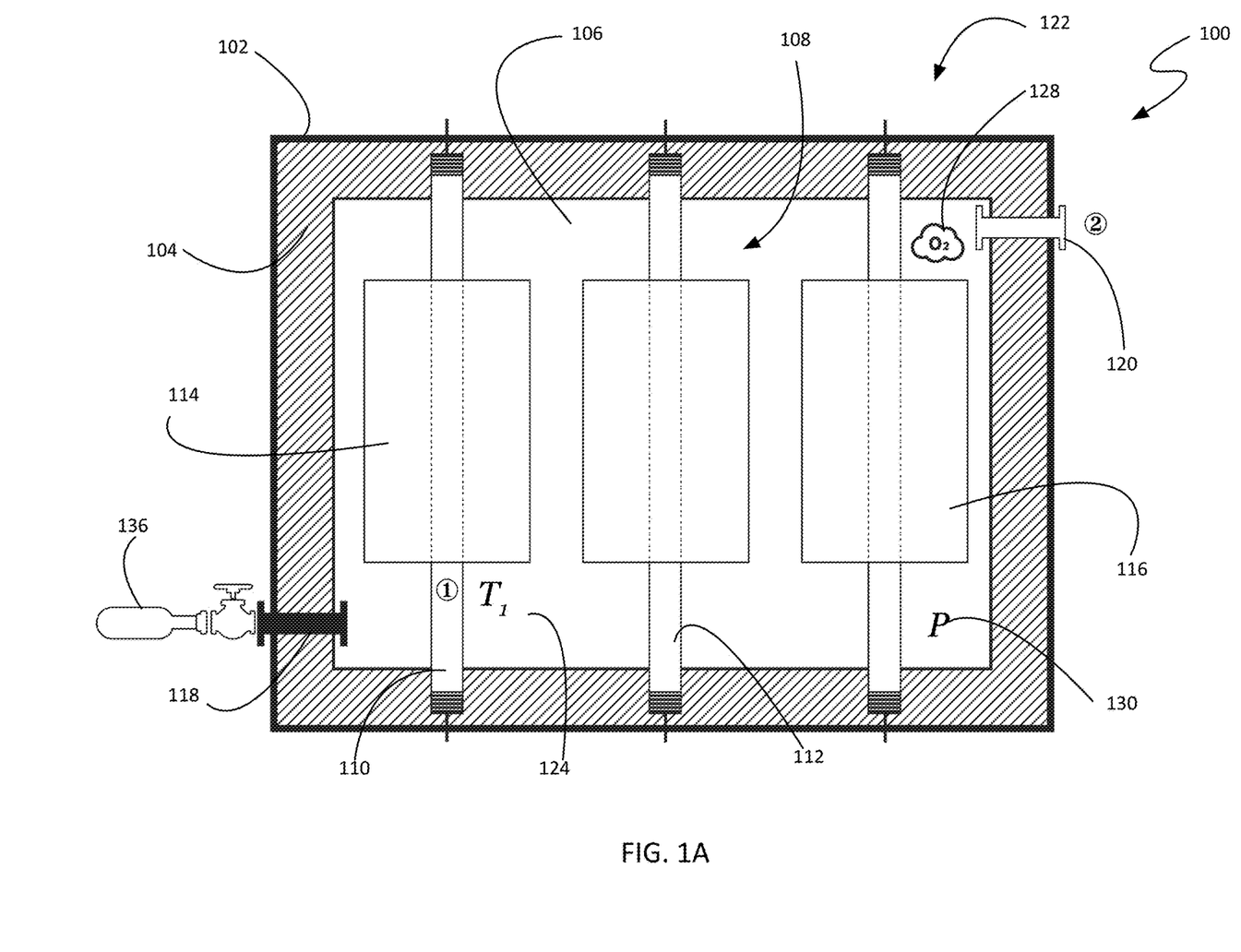
FIGS. 1A and 1B are internal schematic views of a two-step thermochemical reactor in reducing and splitting configurations, respectively.
Figure 1B:
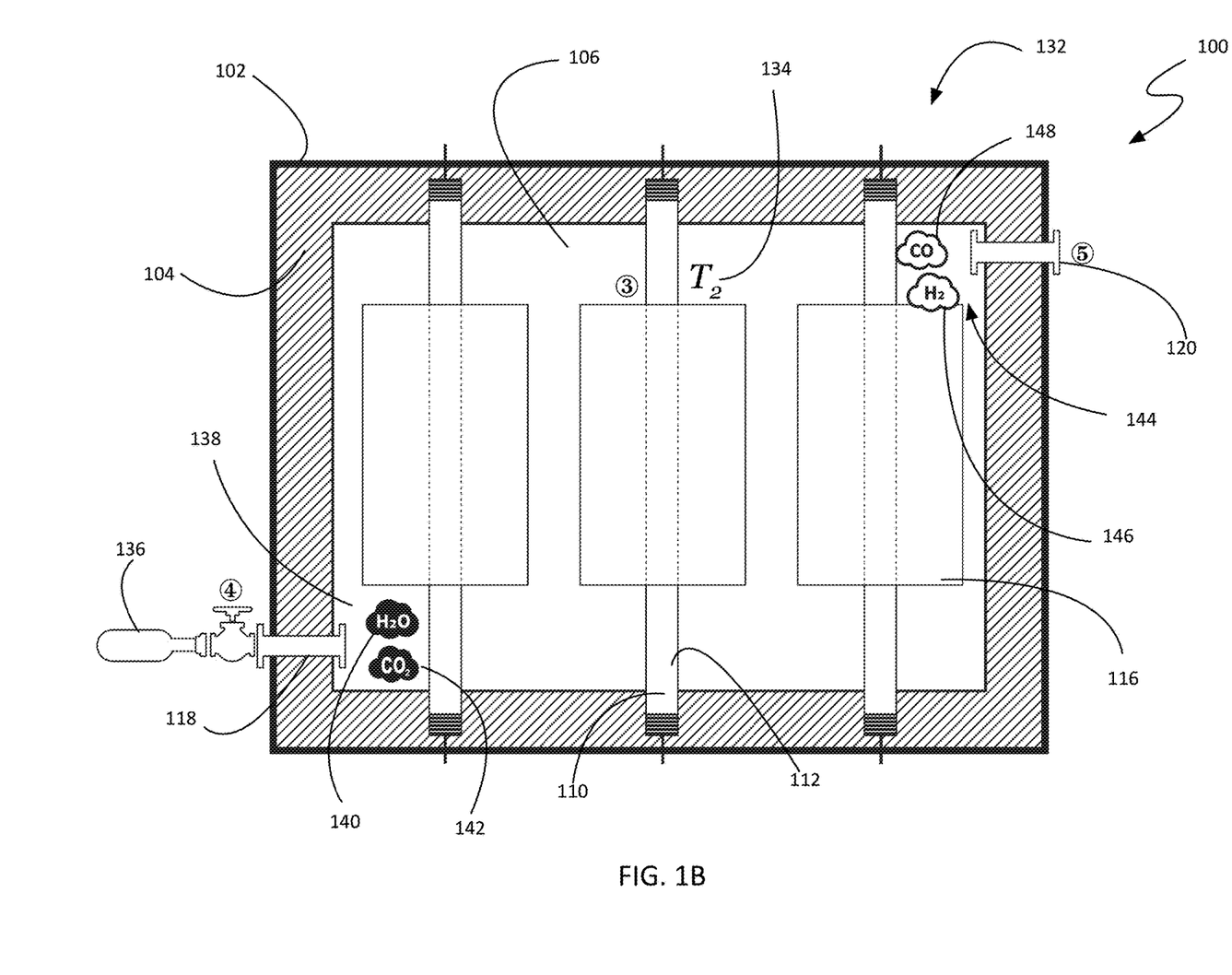

FIGS. 1A and 1B show internal schematic views of a non-limiting example of a thermochemical reactor 100 with a two-step cycle for water or carbon dioxide splitting. Specifically, FIG. 1A shows a thermochemical reactor 100 in a reducing configuration 122, and FIG. 1B shows the reactor 100 in a splitting configuration 132. These configurations will be discussed in greater detail below.

As shown, the reactor 100 comprises a housing 102 comprising a thermal insulation 104. The reactor 100 has a modular design, consisting of one or more unit cells 108 within a reactor cavity 106 inside the housing 102. According to various embodiments, the reactor cavity 106 is formed within, and surrounded by, the thermal insulation 104. Each unit cell 108 comprises an electric heat source 110 and a reactive material 114 that will be reduced and reoxidized repeatedly in the thermochemical cycle. According to various embodiments, the reactor 100 also comprises a feedstock inlet 118 and at least one product outlet 120, all in fluid communication with the reactor cavity 106. The feedstock inlet 118 is also in fluid communication with a feedstock gas source 136, as will be discussed below, with respect to FIG. 1B.

Not shown in FIG. 1 are auxiliary components which may include, but are not limited to, additional feedstock sources, sweep gases, vacuum systems, gas preheating systems, heat recovery systems and mechanisms, product separation systems, process control systems, electrical power sources, and the like.

The housing 102 is thermally insulated, improving the energy efficiency of the reactor 100. In some embodiments, the thermal insulation 104 may comprise insulating materials. In other embodiments, the housing 102 may make use of evacuated, insulating walls. In still other embodiments, the housing 102 may be insulated using any other method known in the art. In some embodiments, the housing 102 may be vacuum tight, while in others the housing 102 may be configured to seal sufficiently to maintain a desired pressure/oxygen partial pressure, which in many embodiments is much lower than atmospheric pressures.

Advantageous over conventional thermochemical reactors heated with concentrated solar flux, the reactor cavity 106 of the reactor 100 does not have an aperture to let in solar flux. Losses through an aperture are difficult to mitigate; that difficulty rapidly increases with temperature. In the contemplated reactor 100, heat loss may be reduced with use of additional or more efficient thermal insulation 104. Not having to deal with losses through an aperture allows the reactor 100 to operate at temperatures practically impossible to employ with concentrated solar flux in conventional reactors.

As shown, each unit cell 108 comprises a reactive material 114. According to various embodiments, the reactive material 114 is a metal oxide 116. Advantageous over conventional thermochemical reactors, the reactor 100 contemplated herein is able to operate with a wide range of reactive MOx materials. As a specific, non-limiting example, in one embodiment the reactive material 114 is cerium oxide. It is important to note that while the following discussion will be in the context of embodiments of the reactor 100 making use of the cerium(IV) oxide-cerium(III) oxide thermochemical cycle, other embodiments may be adapted for use with other metal oxides 116 or other reactive material 114 including, but not limited to, iron oxide and zinc oxide.

Each unit cell 108 also comprises an electric heat source 110. Using electric input enables a simple design that is agnostic to the source of power, making it compatible with numerous renewable sources of electricity including, but not limited to, solar, hydroelectric, wind powered, thermoelectric, and the like. According to various embodiments, this electric heat source 110 is a heat lamp, which transfers energy to the reactive material 114 and reactor cavity 106 through electromagnetic radiation. Conventional electric heat lamps able to reach temperatures over 1450° C., the threshold for this thermochemical cycle, tend to be expensive and very slow. Carrying out the thermochemical cycle within a single reactor cavity 106 and eliminating the need for moving parts means the temperature will need to cycle within that cavity 106. A slow heater will reduce the overall efficiency of the reactor 100. Conventional incandescent heat lamps are able to ramp up and down in temperature very quickly, but have difficulty reaching the desired temperature range.

According to various embodiments, the electric heat source 110 may be a fast-cycling, high temperature incandescent heat lamp 112 comprising a filament housed in an envelope composed of refractory material. Able to ramp up and down in temperature, while also reaching temperatures as high as 1700° C., or higher, these incandescent heat lamps 112 result in shorter cycle times than existing reactor designs, leading to higher productivities per unit $MO_x$, and higher power densities. Higher efficiency and power density are also obtained from the use of more effective heaters that can reach higher reaction temperatures within the reactor cavity 106.

As shown, in some embodiments, the reactive material 114 encircles the electric heat source 110, meaning the reactive material 114 is stationary with respect to at least the electric heat source 110, and in many embodiments the reactor 100 as a whole. The ability to place the heat source inside the reactor cavity 106, rather than utilizing an external heat source such as concentrated solar flux, permits a much greater degree of freedom in choosing a geometry or structure for the reactive material 114. In the temperature ranges and reactions contemplated in the non-limiting example of cerium oxide discussed above, the $CeO_2$ reduction operates predominantly within a surface-controlled regime, meaning greater efficiencies can be achieved by increasing the exposed surface area. Conventional reactors often make use of powdered or particularized metal oxides to maximize surface area and facilitate the transit necessitated by the use of solar flux. At higher temperatures, sintering may become a problem, yet another reason conventional reactors are temperature (and thus, efficiency) limited.

According to various embodiments, the reactive material 114 of each unit cell 108 may be a solid structure having a surface area-maximizing geometry, such as being porous. Placing the heat source 110 within the reactive material 114 of each unit cell 108 permits a more efficient heating of the material 114. Other embodiments may place the heater for each unit cell 108 in a different relative position, or may share heaters between more than one unit cell.

In some embodiments, the electric heat source 110 may be entirely contained within the reactor cavity 106. In other embodiments, a portion of the electric heat source 110 may extend into, or even through, the thermal insulation 104 of the housing 102. For example, as shown in the Figures, in some embodiments, the ends of the heater lamp may be more sensitive to heat than the middle part, and may be protected from damage by positioning the more sensitive ends in the thermal insulation 104. In some embodiments, single ended heat sources 110 may be used, as is known in the art.

As mentioned above, according to various embodiments, the thermochemical reactor 100 comprises a reducing configuration 122, shown in FIG. 1A, and a splitting configuration 132, shown in FIG. 1B. These two configurations represent the two stages of the two-step thermochemical cycle contemplated herein.

As shown, the reducing configuration 122 comprises the feedstock inlet 118 being closed and the electric heat source 110 of each unit cell 108 being driven to thermally reduce the reactive material 114, heating the material 114 to a first temperature 124, releasing oxygen 128 from the reactive material 114 into the reactor cavity 106.

Additionally, the splitting configuration 132 comprises the reactive material 114 of each unit cell 108 being maintained at a second temperature 134 by the electric heat source 110. The second temperature 134 is lower than the first temperature 124. Also, the feedstock inlet 118 is opened to introduce feedstock gas 138 into the reactor cavity 106 to react with and reoxidize the reactive material 114. This results in the splitting of the feedstock gas 138 into a product gas 144, which is received from the reactor cavity 106 through an open product outlet 120.

The cycle contemplated herein may be broken down further. The first step of the contemplated two-step thermochemical cycle for water and/or carbon dioxide splitting begins with heating the reactive material 114 of the unit cells 108 to a first temperature 124. See 'circle 1'. This heat results in the thermal reduction of the reactive material 114. In one embodiment, the first temperature may be at least 1500° C., in another embodiment, the first temperature may be at least 1600° C., and in still another embodiment, the first temperature may be at least 1700° C. In other embodiments, the first temperature may be higher than 1700° C.

Figure 2:
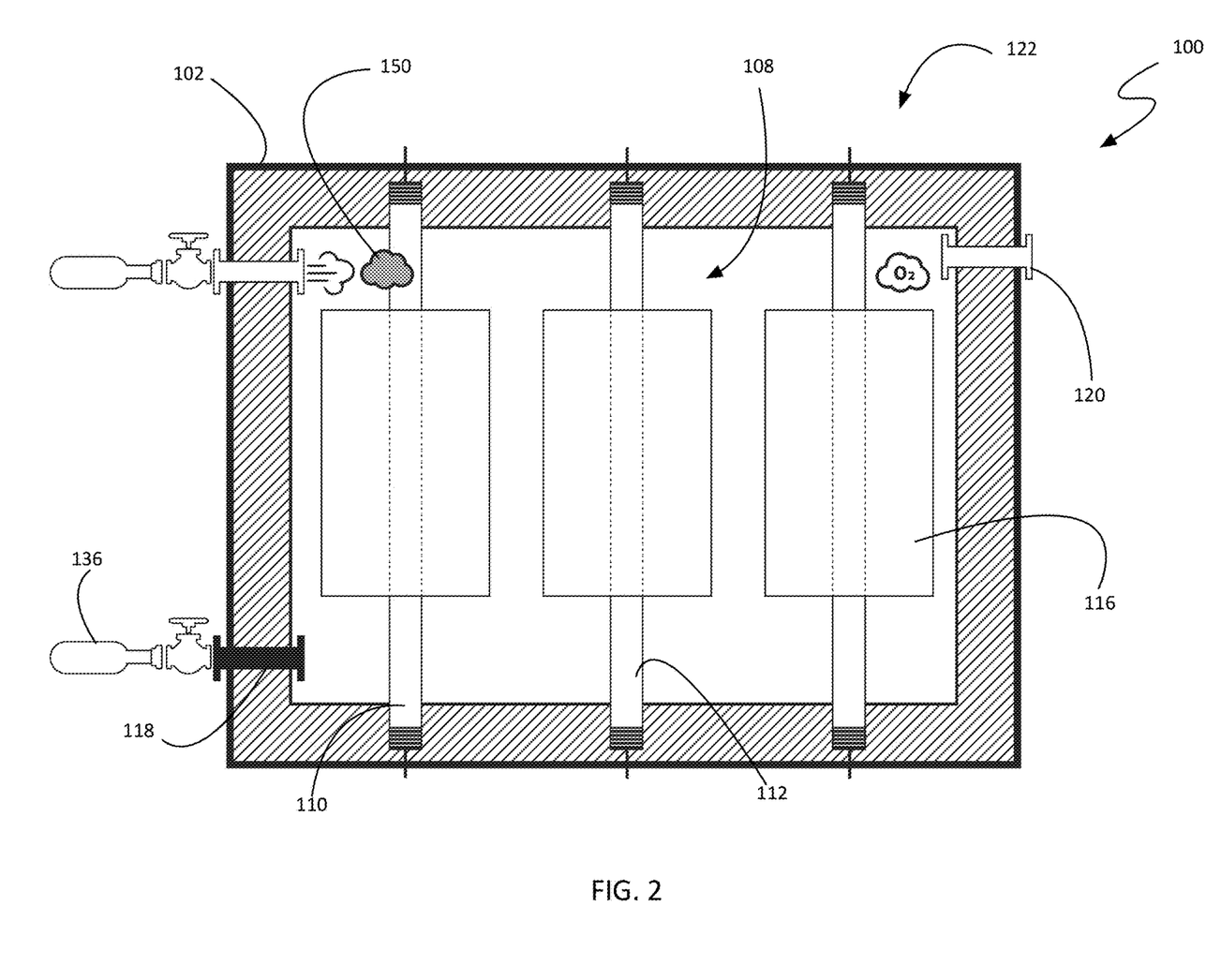
FIG. 2 is an internal schematic view of another embodiment of a two-step thermochemical reactor in a reducing configuration.

According to various embodiments, this heating process may begin with an evacuated or partially evacuated reactor cavity 106. The unit cells are heated to a high temperature within the housing. This removes some of the oxygen 128 from the reactive material 114, typically at low oxygen partial pressure, relative to ambient. As a specific example, in one embodiment, the heating of the reactive material may introduce to the reactor cavity 106 a low oxygen partial pressure no greater than 100 Pa. The oxygen 128 freed from the reactive material 114 may continue to be removed from the reactor cavity 106 through an outlet (e.g. a product outlet 120, etc.) as the internal pressure, or just the oxygen partial pressure in some embodiments, is maintained at a pressure 130 that is at least two orders of magnitude below atmospheric levels. In other embodiments, the pressure 130 may be at least three orders of magnitude below atmospheric pressure. See 'circle 2'. The removal of the oxygen gas 128 from the reactor cavity 106 prepares the reactor 100 for the second step, which involves placing the reactor 100 in the splitting configuration 132, shown in FIG. 1B. In other embodiments, the oxygen 128 may be removed from the reactor cavity 106 using an inert sweep gas 150, as shown in FIG. 2. In some embodiments, steam may be used as a sweep gas. For example, in one embodiment, a continuous stream of steam may serve, at high temperatures, as a reductant, and at lower temperatures, as an oxidizer, all the while moving the gaseous products of these reactions out of the reactor cavity.

Transitioning into the splitting configuration 132 requires a reduction in the energy sent to the electric heat sources 110, allowing the reactive material 114 to cool down to the second temperature 134. See 'circle 3'. While this is being done, the inlets and outlets may be closed, preventing any gas exchange. According to various embodiments, the second temperature 134 may be roughly 1000° C. for cerium oxide. Those skilled in the art will recognize that the first and second temperatures may change, depending on the reactive material 114 being used.

Once the second temperature 130 has been achieved, and is being maintained by the electric heat sources 110, a feedstock gas 138 is introduced to the reactor cavity 106 through the feedstock inlet 118. See 'circle 4'. The feedstock gas 138 reoxidizes the reactive material 114. The feedstock gas 138 is introduced to the cavity 106 at a lower temperature and/or a higher pressure than exists in the cavity 106 when in the reducing configuration 122, according to various embodiments. According to various embodiments, the feedstock gas 138 is at least one of steam 140 and carbon dioxide 142, as shown. Other feedstock gases 138 may be used in other embodiments, with appropriate reactive materials 114, as well as first and second temperatures.

The introduction of the feedstock gas 138 to the partially reduced reactive material 114 results in the removal of oxygen 128 from the feedstock 138, effectively splitting it to yield hydrogen 146 and/or carbon monoxide 148, as shown. In our specific, non-limiting example, this takes at least some of the partially reduced cerium oxide to back to cerium(IV) oxide, in preparation for the next cycle.

Finally, the results of the splitting are removed from the cavity 106 through a product outlet 120. See 'circle 5'. Again, in our non-limiting example of the application of water (i.e. steam) and carbon dioxide as feedstock gases 138 will result in a mixture of hydrogen 146 and carbon monoxide 148, or syngas. Typically, there is also residual steam 140 and carbon dioxide 142 recovered through the product outlet 120, as well. These gases may then be processed for further use, whether that be reuse in the reactor 100 or applied to another process.

Where the above examples, embodiments and implementations reference examples, it should be understood by those of ordinary skill in the art that other reactive materials, feedstock gases, and product gases could be intermixed or substituted with those provided. In places where the description above refers to particular embodiments of a two-step thermochemical reactor, it should be readily apparent that a number of modifications may be made without departing from the spirit thereof and that these embodiments and implementations may be applied to other reactor technologies as well. Accordingly, the disclosed subject matter is intended to embrace all such alterations, modifications and variations that fall within the spirit and scope of the disclosure and the knowledge of one of ordinary skill in the art.

What is claimed is:

1. A thermochemical reactor, comprising:
 a housing comprising a thermal insulation;
 a reactor cavity formed within, and surrounded by, the thermal insulation such that there is no aperture through the thermal insulation to allow solar flux into the reactor cavity, the reactor cavity comprising at least one unit cell, each unit cell of the at least one unit cell comprising:
  an electric heat source, and
  a reactive material;
 a feedstock inlet in fluid communication with the reactor cavity and coupled to a feedstock gas source supplying a feedstock gas; and
 a product outlet in fluid communication with the reactor cavity;
 wherein the thermochemical reactor also comprises a reducing configuration and a splitting configuration,
 wherein the reducing configuration comprises the inlet being closed and the electric heat source of each of the at least one unit cell being driven to thermally reduce the reactive material at a first temperature, releasing oxygen from the reactive material into the reactor cavity, and
 wherein the splitting configuration comprises the reactive material of each of the at least one unit cell being maintained at a second temperature by the electric heat source, the second temperature lower than the first temperature, the feedstock inlet being open and introducing feedstock gas into the reactor cavity to react with and reoxidize the reactive material, the feedstock gas splitting into a product gas received from the reactor cavity through the product outlet, the product outlet being open.

2. The thermochemical reactor of claim 1, wherein the reactive material comprises a metal oxide.

3. The thermochemical reactor of claim 2, wherein the metal oxide is cerium oxide.

4. The thermochemical reactor of claim 1, wherein the feedstock gas comprises at least one of steam and carbon dioxide, and wherein the product gas comprises at least one of hydrogen and carbon monoxide.

5. The thermochemical reactor of claim 1, wherein the electric heat source is an incandescent heat lamp.

6. The thermochemical reactor of claim 5, wherein the first temperature is above 1600° C.

7. The thermochemical reactor of claim 1 wherein, for each unit cell of the at least one unit cell, the reactive material is stationary with respect to the electric heat source.

8. The thermochemical reactor of claim 1, wherein at least one of the product gas and the oxygen is removed from the reactor cavity using a sweep gas.

9. The thermochemical reactor of claim 1, wherein the reducing configuration further comprises the reactor cavity being evacuated and maintained at a pressure at most $1/100^{th}$ of atmospheric pressure to remove at least the oxygen released by the reactive material from the reactor cavity.

10. The thermochemical reactor of claim 1 wherein, for each unit cell in the at least one unit cell, the reactive material encircles the electric heat element.

11. A method for a thermochemical reactor cycle, comprising:
heating a reactive material to a first temperature with an electric heat source to thermally reduce the reactive material and release oxygen, the reactive material and the electric heat source enclosed within a reactor cavity formed within, and surrounded by, thermal insulation such that there is no aperture through the thermal insulation to allow solar flux into the reactor cavity;
removing the released oxygen from the reactor cavity;
cooling the reactive material to a second temperature maintained by the electric heat source, the second temperature lower than the first temperature;
reoxidizing the reactive material by introducing a feedstock gas into the reactor cavity, the feedstock gas reacting with the reactive material and splitting into a product gas; and
removing the product gas from the reactor cavity;
wherein the reactive material is stationary with respect to the electric heat source,
wherein the feedstock gas comprises at least one of steam and carbon dioxide, and
wherein the product gas comprises at least one of hydrogen and carbon monoxide.

12. The method of claim 11, wherein the electric heat source is an incandescent heat lamp.

13. The method of claim 11, wherein the first temperature is above 1600° C.

14. The method of claim 11, further comprising removing at least one of the product gas and the oxygen from the reactor cavity using a sweep gas.

15. The method of claim 11, wherein removing the released oxygen from the reactor cavity comprises evacuating the reactor cavity, removing the oxygen while maintaining the reactor cavity at a pressure at least two orders of magnitude below atmospheric pressure.

16. The method of claim 11 wherein the reactive material encircles the electric heat element.

* * * * *